UNITED STATES PATENT OFFICE.

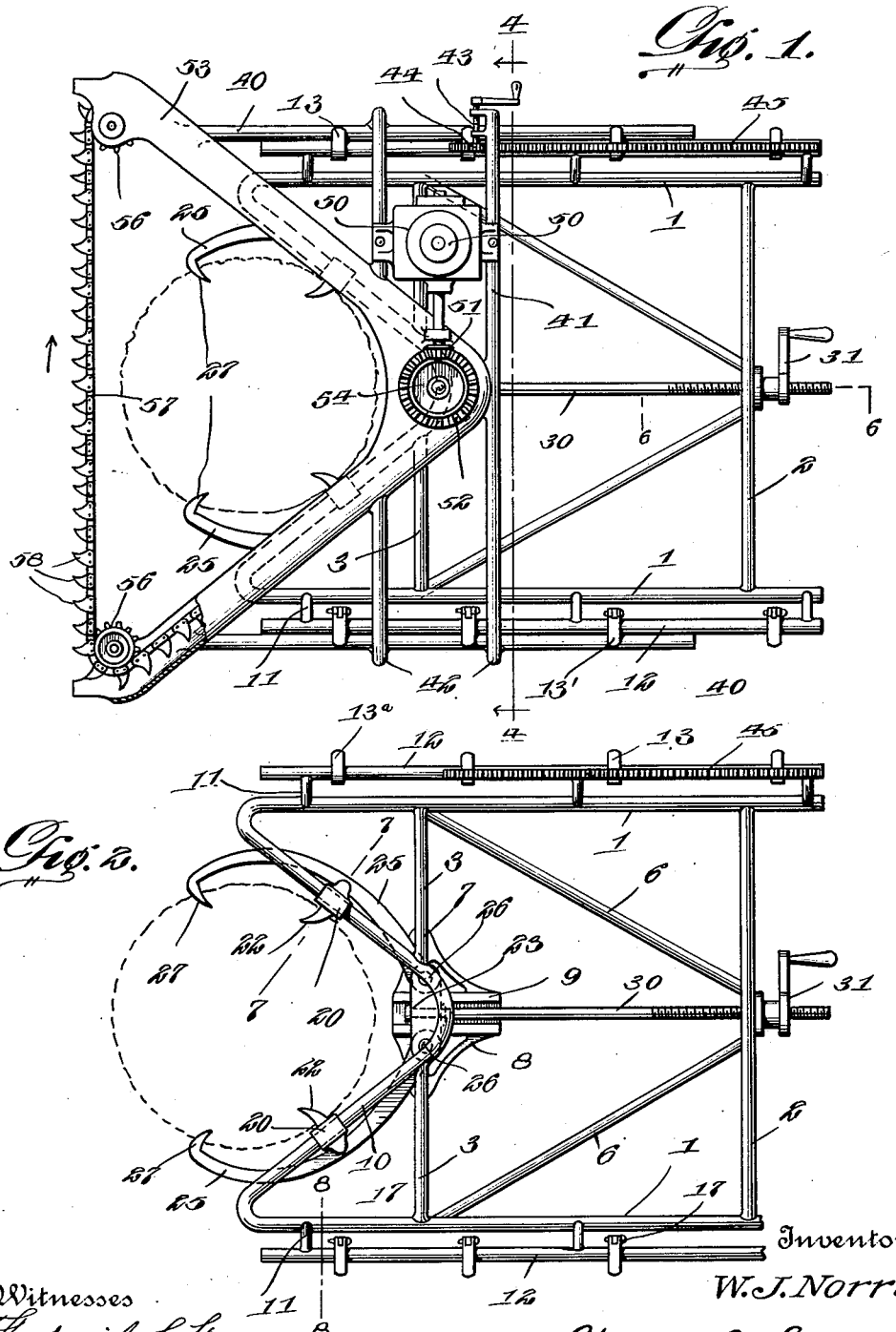

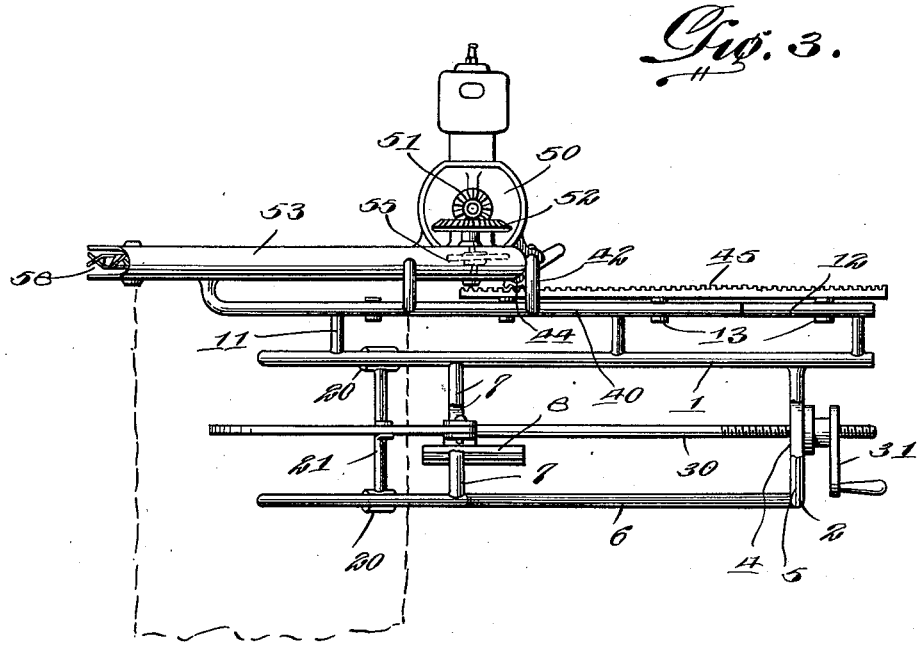

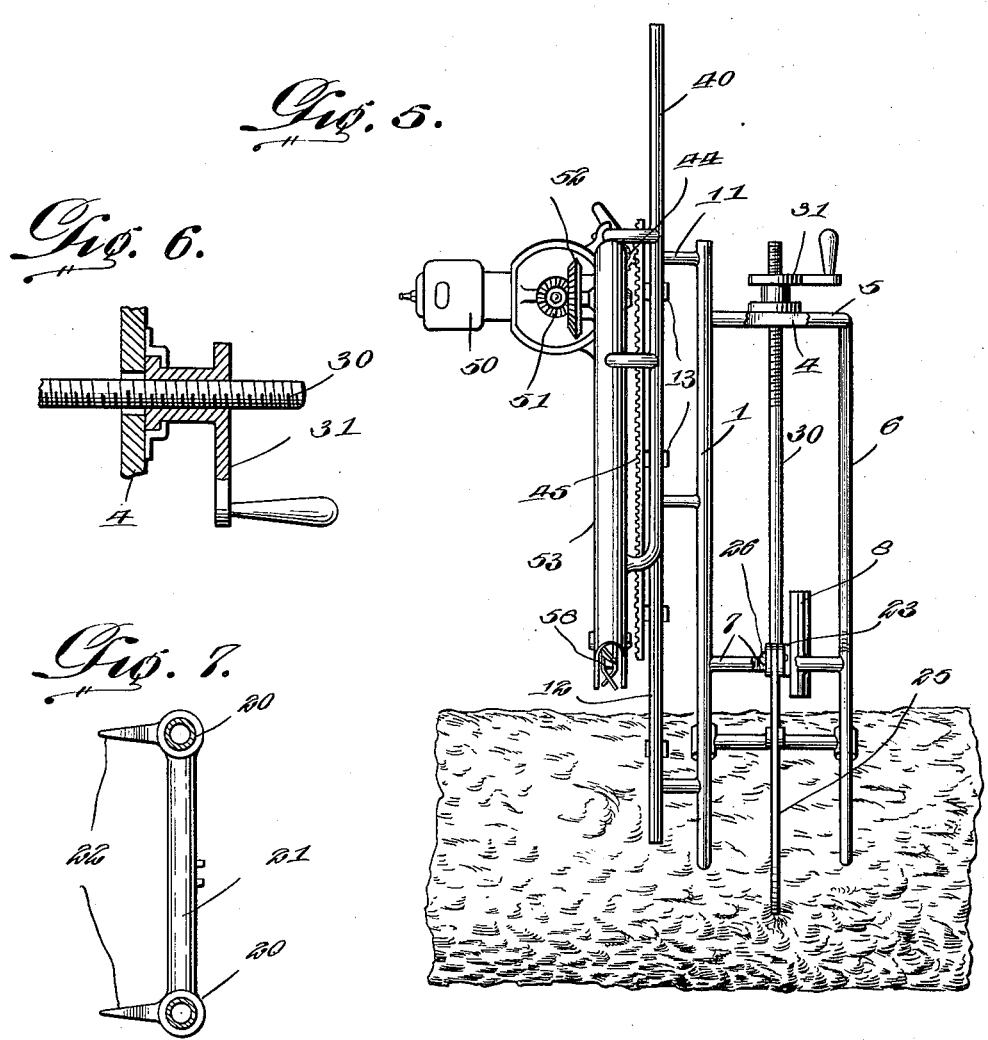

WILLIE J. NORRIS OF CHALYBEATE SPRINGS, NORTH CAROLINA.

WOOD-SAWING MACHINE.

1,335,694.  Specification of Letters Patent.  Patented Mar. 30, 1920.

Application filed June 27, 1919. Serial No. 307,170.

*To all whom it may concern:*

Be it known that I, WILLIE J. NORRIS, a citizen of the United States, residing at Chalybeate Springs, in the county of Harnett and State of North Carolina, have invented new and useful Improvements in Wood-Sawing Machines, of which the following is a specification.

The object of my present invention is the provision of an easily applied, easily controlled and efficient power machine, susceptible of use to advantage in sawing standing trees, as well as tree trunks in recumbent position upon the ground.

To the attainment of the foregoing, the invention consists in the peculiar and advantageous wood-sawing machine hereinafter described and definitely claimed.

In the accompanying drawings, hereby made a part hereof:

Figure 1 is a view, partly in plan and partly in section of the wood-sawing machine constituting the best practical embodiment of my invention of which I am cognizant, as the same appears when applied to a standing tree and after the working stretch of the saw belt has been advanced through the tree for the sawing thereof.

Fig. 2 is a plan view of the supporting form *per se* of the machine.

Fig. 3 is a side elevation of the machine as it appears in Fig. 1.

Fig. 4 is a transverse section taken in the plane of the line 4—4 of Fig. 1, looking forwardly.

Fig. 5 is an elevation illustrating my novel machine as the same appears when applied in upright position to a trunk lying upon the ground.

Fig. 6 is an enlarged detail section taken in the plane indicated by the line 6—6 of Fig. 1.

Fig. 7 is a detail section taken in the plane of the line 7—7 of Fig. 2.

Fig. 8 is an enlarged detail section taken in the plane of the line 8—8 of Fig. 2.

Fig. 9 is a detail perspective showing the relative arrangement of bars 2, 4 and 5 and brace 6.

Similar numerals of reference designate corresponding parts in all of the views of the drawings.

My novel sawing machine comprises a supporting frame susceptible of use in a horizontal or approximately horizontal position, Figs. 1 to 4, and also of use in an upright position, Fig. 5; and it also comprises a carriage adapted to be expeditiously and easily connected with the supporting frame, and as readily disassociated therefrom for convenience in storage or transportation.

For the sake of convenience, I will describe the supporting frame and the carriage separately. Therefore, by comparison of Figs. 1 to 4 it will be observed that the supporting frame, which is preferably constructed of metallic tubing, includes spaced longitudinal bars 1 at opposite sides of the frame, transverse bars 2 adjacent to the rear end of the frame, spaced transverse bars 3 adjacent to the forward end of the frame, a bar 4 interposed between and joining the rear transverse bars, rear corner bars 5, Fig. 3, pairs of spaced diagonal braces 6, and bars 7 interposed between and connecting the forward transverse bars 3, Fig. 4. It will be readily understood that all of these elements are fixed with respect to each other, in order to form a unitary frame, and it will also be understood by comparison of Figs. 2 and 4 that the bars 7 are connected through the medium of a plate or casting 8 in which is a channel 9, of dove-tail form in cross-section. The longitudinal bars 1 are merged at their forward ends into V-shaped trunk-straddling portions 10, which portions 10 are disposed in spaced and parallel relation to each other. It will also be observed that the longitudinal bars 1 adjacent to the carriage are provided with lateral arms 11 which are connected by longitudinal bars 12 offset laterally beyond the vertical planes of the bars 1, as best shown in Fig. 4. At one side of the frame U-shaped holders 13 are made to straddle one of the said bars 12 of the supporting frame, and are brazed or otherwise fixed to said bar so as to extend laterally outward therefrom. At the opposite side of the machine analogous holders 13ª are employed. Each of the holders 13ª, however, is made up of a lower member 14 and an upper member 15; the lower member 14 being fixedly connected at 16 to the adjacent bar 12, and the upper member 15 being detachably connected to the lower member 14 through the medium of a key 17, of angular form in cross-section. Manifestly when the keys 17 are arranged as shown in Fig. 8 to connect the members 14 and 15, the members 15 will be held to and against swinging movement on the members 14. When, however, the keys 17 are removed or adjusted, the members 15 may be swung inwardly from their positions overhanging the members 14.

In order that the supporting frame may be strongly affixed to a tree trunk, I provide the means best shown in Figs. 2 and 4. The said means comprises sleeves 20 slidable on the trunk-straddling portions 10, bars 21, each carrying a pair of the said sleeves 20, Fig. 7, dogs 22 reaching inwardly and forwardly from the said sleeves, a cross-head 23 having a dove-tail portion 24, Fig. 4, held and movable longitudinally in the channel guide 9 of the plate or casting 8, and grapple members 25, pivoted at 26 to the cross-head 23 and having dogs 27. Connected to the cross-head 23 and extending rearwardly therefrom and loosely through an aperture in the bar 4 is a threaded rod 30, and mounted on and engaging the said rod 30 is a lever nut 31 that is swiveled to the bar 4, preferably in the manner shown in Fig. 6, and is arranged to receive and engage the threaded rod so that rotation of the said lever nut will be attended by forward or rearward movement of the rod 30, according to the direction of rotation of the said nut. Manifestly when the threaded rod 30 is retracted or moved rearwardly, the attending rearward movement of the cross-head 23 will cause the dogs 27 to sink into and take secure hold of the tree trunk, indicated by dotted lines, and at the same time the dogs 22 will be forced forwardly and inwardly into secure engagement with the trunk, with the result that the supporting frame will be strongly affixed to the trunk in such manner that there is no liability of said frame sagging. In this connection it will be apparent that by virtue of the general V-shape of the forward frame portions and the adaptability of the sleeve 20 to slide on the said portions, the dogs 22 will accommodate themselves to the diameter of the trunk, and in that way contribute materially to the security of the fixture of support to the trunk.

The carriage of the machine is detachably associated with the support in the manner hereinafter specifically referred to, and is made up of longitudinal bars 40 and transverse bars 41, the transverse bars 41 having downwardly and inwardly directed end portions 42 through which they are joined to the bars 40, as best appears in Fig. 4. Carried by one of the end portions of one transverse bar 41, is a crank shaft 43 on which is a pinion 44, intermeshed with a longitudinal rack bar 45, fixed at one side of the support, as shown. By turning of the crank of the shaft 43, the operator is enabled to feed the carriage forwardly on the support incidental to the progress of the sawing operation, and is also enabled to conveniently retract the carriage to place the same in position for the commencement of a sawing operation. Mounted in fixed relation on the transverse bars 41 of the carriage is a motor 50, preferably in the form of an internal combustion engine, the drive shaft of which is equipped with a miter gear 51 that is intermeshed with a larger miter gear 52, as shown. Fixed on the forward portion of the carriage is a housing 53, of general V-shape in configuration, and of channel form in cross-section, with its mouth foremost. The gear 52 is fixed on a shaft 54 journaled in the apex portion of the housing 53, and on said shaft 54 is fixed a sprocket gear 55. Idler sprocket gears 56 are mounted in the housing 53 adjacent to the ends of the housing and at opposite sides of the mouth thereof. Around the sprocket gears 55 and 56 is trained a sprocket belt 57 on which are saw teeth 58. By virtue of the construction described, it will be observed that when the motor 50 is in operation, the sawing belt will be properly driven to enable the stretch that moves across the mouth of the housing 53 to cut its way through a trunk.

By virtue of the construction of the carriage holding members on the support of the machine, it will be manifest that when it is desired to attach the carriage to the support, the same may be accomplished by placing one of the longitudinal bars 40 of the carriage in the holders 13 at one side of the support and then placing the longitudinal bar 40 at the opposite side of the support in the holders 13a; this latter operation being carried out while the sections 15 of the holders 13a are positioned away from their overhanging position about the sections 14. Then when the sections 15 are restored to working position and are secured by the before-mentioned angular keys, the holder section 15 will securely retain the mentioned bar 40 of the carriage in the holders. Manifestly the detachable connection referred to of the carriage to the support, will not interfere in any measure with the rectilinear movement described of the carriage on the support.

As will be readily appreciated by comparison of Fig. 5 with Figs. 1 to 4, my improved machine is capable of use to advantage on a horizontally disposed trunk as well as upon an upright.

It is to be understood that the specific description set forth is incorporated herein with a view to imparting a full, clear and exact understanding of the best practical embodiment of my invention of which I am cognizant, and that it is not my intention to restrict myself to the specific construction and relative arrangement of parts, the scope of my invention being measured by my appended claims.

Having described my invention, what I claim and desire to secure by Letters-Patent, is:

1. The combination of a frame having a V-shaped forward portion adapted to straddle a tree trunk, dogs adapted to be embedded in the trunk means carrying said dogs and slidable at the sides of the said V-shaped portion, grapple members having dogs adapted to be embedded in a trunk in advance of the first-named dogs, and means connected with the frame and said grapple members for retracting the rear portions of the latter.

2. The combination of a frame having a V-shaped forward portion adapted to straddle a tree trunk, dogs adapted to be embedded in the trunk means carrying said dogs and slidable at the sides of the said V-shaped portion, grapple members having dogs adapted to be embedded in a trunk in advance of the first-named dogs, a cross-head pivotally connected to the rear ends of the grapple members and headed in the frame, a threaded rod connected with said cross-head, and a lever nut mounted on and engaging said threaded rod and abutting forwardly against the frame.

3. The combination of a frame having a V-shaped forward portion adapted to straddle a tree trunk, dogs adapted to be embedded in the trunk means carrying said dogs and slidable at the sides of the said V-shaped portion, grapple members having dogs adapted to be embedded in a trunk in advance of the first-named dogs, a cross-head pivotally connected to the rear ends of the grapple members and having a dove-tail portion movable in a dove-tail channel of the frame, a threaded rod connected to and extending rearwardly from the cross-head, and a lever nut mounted on and engaging the threaded rod and connected in swiveled manner with the frame and abutting forwardly against the frame.

4. The combination of a frame having spaced V-shaped forward portions fixedly connected together and adapted to straddle a tree trunk, sleeves mounted and slidable on the sides of said V-shaped portions, a rod interposed between and fixed with respect to the sleeves at one side of the V-shaped portion, a rod interposed between and fixed to the sleeves at the opposite side of the V-shaped portion, dogs carried by said sleeve, and grapple members having dogs adapted to be embedded in a tree trunk in advance of the first named dog, and means for retracting the rear portions of said grapple members; the connections between the grapple members and said means being arranged to permit of inward and outward swinging of the dog-bearing portions of the grapple members.

5. The combination of a frame having a V-shaped portion adapted to straddle a tree trunk, dogs adjustable on the sides of said V-shaped portion, grapple members for co-operation with said dogs, and means for cooperating with said grapple members and the frame for engaging the dogs and the grapple members with a tree trunk.

6. The combination of a support, having side bars, holder members fixed to one of said bars and extending laterally outward therefrom and open at their outer ends, holder members respectively comprising sections fixed to and extending outwardly from the other side bar, and sections keyed to the first-named sections and normally secured against movement away from same; said holder members being open at their outer ends, and a carriage having inwardly reaching portions on which are longitudinal bars disposed and slidable in said holder members.

In testimony whereof I affix my signature.

WILLIE J. NORRIS.